United States Patent Office 3,030,338
Patented Apr. 17, 1962

3,030,338
POLYMERIZATION OF FORMALDEHYDE
Robert S. Aries, 77 South St., Stamford, Conn.
No Drawing. Filed Jan. 26, 1959, Ser. No. 788,776
7 Claims. (Cl. 260—67)

The present invention relates to the preparation of a useful and valuable polymer of formaldehyde, which polymer is also known as polyoxymethylene. More particularly, the invention concerns a novel method for the polymerization of monomeric formaldehyde with the aid of finely divided silica.

Although the polymerization of formaldehyde has been known qualitatively for more than 100 years, the different types of polyformaldehyde were not adequately characterized until Staudinger (Helv. Chim. Acta, vol. 8, 1925, and Annalen, vol. 474, 1929) reported his investigations on, and the separation of, a series of linear polyoxymethylenes

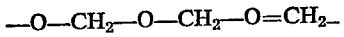

the average molecular weight of which he established by analytic determination of the end groups. Using acetic anhydride as catalyst Staudinger succeeded in preparing linear polyoxymethylenes consisting of more than 50 monomer units, corresponding to molecular weights up to and somewhat above 1500.

These polymeric materials were crystalline, hard, white powders with melting points of about 100° C., which, however did not exhibit any important mechanical strength. From the chemical point of view they were diacetates of polyoxymethylene with one $CH_3CO-$ group at each end of the polymer molecule, and were soluble in various organic solvents such as ketones and esters. By repeated fractionation these polymers could be purified and relatively homogeneous fractions were isolated and analytically characterized. They were relatively stable in the absence of hydrolyzing agents, but became subject to degradation when the acidic end-groups were liberated because the resulting hemiacetals are, as is well known, very sensitive to acid degradation, or even to heat alone, and the chains then rapidly depolymerize to the monomer. Somewhat more stable materials were obtained when methoxy end-groups, $-OCH_3$, were introduced with the aid of diazomethane, dimethyl sulfate or methyl iodide. It was also found that the higher molecular weight species are more stable, probably because of their lower end-group content and also because of their higher degree of crystallinity.

In the course of these experiments it was observed that small proportions of an insoluble high polymer were always formed. The insoluble material is a hard, white horny mass which also shows a certain degree of crystallinity, is insoluble in all solvents at ordinary temperatures and becomes somewhat soluble in some solvents above 80° C. This high polymer is apparently stable to all chemical reagents up to about 80° C., and softens gradually if heated above 140° C. In the liquid state and particularly in the presence of acids, this high polymer depolymerizes relatively rapidly into the monomer. Because of the properties of this high polymer and particularly because of the low acetyl content, representing the end-groups, Staudinger identified this material as a polyoxymethylene of much higher molecular weight and estimated from the end-group analysis that some samples had molecular weights between 50,000 and 100,000. The amount and the degree of polymerization (DP) of these superpolyoxymethylenes depended in a somewhat complicated manner upon the purity of the monomer and on the solvents in which the polymerization was carried out, upon the amount of catalyst used, and upon the temperature of polymerization.

Because of the absence of reliable methods of characterizing such products quantitatively at the time of Staudinger's investigations, Staudinger did not pursue this investigation any further. However, in the light of our present greatly improved knowledge of truly high polymeric polyoxymethylenes the higher molecular weight, higher melting materials obtained by Staudinger were undoubtedly linear high molecular weight polyformaldehydes, and essentially identical with the various types which can now be obtained by improved methods.

Staudinger in his book "die hochmolekularen organischen Verbindungen" (Springer), Berlin, 1932 considered polyformaldehyde to be "a synthetic model polymer" for cellulose. The experiments which formed the basis of the present invention were directed toward obtaining the highest molecular weight species in good yields, much higher than Staudinger's limited yields.

The general principles of polymerization kinetics which were not known in 1929 but were well established at a later period led first to an examination whether this polymerization is initiated by free radicals or by ions. In a series of qualitative exploratory tests I found that free radical formers such as benzoyl peroxide or azo-bis-isobutyronitrile did not initiate the polymerization of formaldehyde. Benzoyl peroxide oxidizes formaldehyde to formic acid and $CO_2$, while azo-bis-isobutyronitrile apparently does not react at all with formaldehyde. I then experimented with cationic initiators and found that boron trifluoride hydrate initiates the polymerization in such a manner that the hydrate first dissociates into a proton and a complex anion, as follows:

The proton attacks the monomer and forms a carbonium ion as follows:

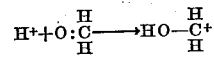

This carbonium ion adds another monomer molecule as follows:

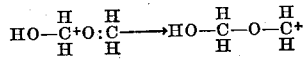

and a conventional cationic propagation reaction results which builds a linear polyoxymethylene chain:

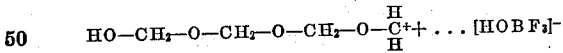

the charged end of which is always in the proximity of the negative counter-ion, $[HOBF_3]-$. Termination occurs if the positively charged chain-end and the negatively charged counter-ion react with each other. In this case the complex counter-ion is decomposed, a hydroxyl group is produced at the end of the growing chain and boron trifluoride is liberated to yield:

The boron fluoride eventually picks up another molecule of water, again forms the hydrate, the hydrate dissociates again, produces a proton as before and the proton starts the growth of a new chain and the entire cycle is repeated until all the water has been consumed. In fact, I was able to show by the use of deuterated water, $D_2O$, and $BF_3$ that all the deuterium of the system was ultimately located at the end-groups of the polymer chains in the form of $-OD$ groups which could be identified by infrared analysis.

These results showed that the DP of the high molecular weight polymer produced was essentially determined by the concentration of the water in the system. The higher the concentration of water, the lower was the DP, which is given simply by the ratio of the number of formaldehyde molecules, F, which undergo polymerization and the number of the molecules of water, W, which together with the $BF_3$ act as initiators:

$$DP = \frac{F}{W}$$

In order to obtain a high DP material it is necessary to use very dry monomer, and also a very dry solvent in which the reaction is carried out. On the other hand, the rate of polymerization, R, is given by the product of the monomer concentration F and the concentration of protons which act as initiators:

$$R \sim F \cdot H^+$$

The proton concentration in turn is proportional to the product of the water concentration, W, and the $BF_3$ concentration, B, hence $$R \sim F \cdot W \cdot B.$$

This decreases as W becomes very small. In fact, I have found that with a system containing only 0.01% $H_2O$ on the monomer I obtained exclusively high DP polyformaldehyde, but it required 4 days to obtain a conversion of 25%. The problem, therefore, was to relate the high DP of the product to an economically reasonable rate of polymerization.

Analogous conditions were encountered when I studied the polymerization of formaldehyde with anionic catalysts. I used several types of anionic catalysts such as alkali metals and alkali metal alkyls in aromatic hydrocarbons and in ethers as solvents. In this case, it was relatively easy to obtain polymers in the molecular weight range up to 2000 which were white, crystalline powders consisting of linear polyoxymethylene molecules with hydroxyl end-groups. After acetylation of these hydroxyl end-groups the products are essentially identical with the polymers obtained by acid catalysis. Kinetic studies, based on the measurement of the reaction rate and molecular weight as a function of catalyst and monomer concentration, indicate that an anion $A^-$ initiates the chain growth by:

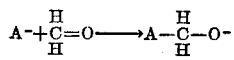

and propagates the polymer formation by repetitive addition of the monomer to the anionic chain end:

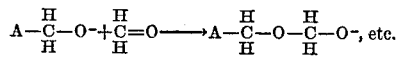

These growing chains can be terminated either by the cation which originally belonged to $A^-$, namely $Li^+$ or $Na^+$, or even more easily by protons which happen to be in the system because of traces of moisture content. In fact, I found that high molecular weight polymers could be obtained only if all the components of the polymerization system were kept anhydrous in conformity with the results obtained with cationic initiators. But in the case of anionic polymers, the absence of water, or extremely low concentration of water, did not decrease the rate of polymerization as drastically as with the boron fluoride complexes because $H_2O$ is here not a component of the catalyst as was the case with boron trifluoride hydrate. However, there was some decrease in the polymerization rate, probably because of the influence of water on the dissociation of the initiator.

By the use of relatively long reaction times, laboratory quantities of high molecular weight paraformaldehyde were prepared and their principal properties were determined. Table I shows the results obtained with cationic and anionic initiators in the polymerization of formaldehyde:

TABLE I

| Property | Cationic polymer | Anionic polymer |
| --- | --- | --- |
| Specific gravity | 1.43 | 1.43 |
| Molecular weight | 400,000 | 200,000 |
| Melting point ° C | 190 | 183 |
| Brittle point ° C | −38 | −34 |
| Tensile strength, p.s.i. | 15,000 | 11,000 |
| Percent water absorption | 0.4 | 0.4 |
| Impact strength (Izod) | 2.2 | 1.4 |

The following procedure was used to make superpolyoxymethylenes of this type:

Anhydrous liquid monomeric formaldehyde was first prepared. The raw material was commercial trioxane which was recrystallized three times from dry toluene and finally thoroughly dried in high vacuo for 24 hours at 50° C. The dry trioxane was depolymerized in a vacuum system by distilling about 0.01 gram of acetic anhydride onto 25 grams of dry dioxane cooled by a liquid air bath so that the acetic anhydride condensed onto the trioxane. The tube containing the trioxane and the small amount of acetic anhydride was then heated gradually to 150° C. at which temperature the trioxane depolymerizes to formaldehyde. The heating was controlled so that a slow steady stream of formaldehyde was liberated, and passed through a tube containing anhydrous sodium sulfate and condensed in a trap cooled by liquid air, where the monomeric formaldehyde deposited as a white fluffy powder. When the trioxane was visually judged to have depolymerized to the extent of about 85%, the heating was interrupted, the trap containing the solid formaldehyde was sealed off from the generating section, and the temperature was permitted to rise to −90° C. at which temperature the anhydrous monomeric formaldehyde melts to a colorless mobile liquid, which is a suitable raw material for polymerization to high molecular weight polyformaldehyde, and was used for the polymerization experiments by allowing it to rise in temperature so that gaseous formaldehyde distills out to the reactor.

Using this method of preparation on various laboratory scales, quantities of 100 grams or more of relatively pure monomeric liquid formaldehyde were prepared.

It is known that monomeric formaldehyde can be completely purified by prepolymerization of a portion of it in such a manner that the remainder polymerizes to a true high polymer with intrinsic viscosities of 2.0 or more. The term intrinsic viscosity refers to measurements made at 0.5% concentration in p-chlorphenol at 60° C. This prepolymerization also purifies the environment (solvent or diluent) in which it is carried out and readies the system for the final polymerization step. In order to elucidate the mechanism of this "purification," I have conducted a series of tests on the prepolymer formed and I have found that it always has a relatively low molecular weight, corresponding to an intrinsic viscosity in the range of 0.05 to 0.50. The analysis of the end-groups of these prepolymers revealed essentially —OH and —$OCH_3$ groups, indicating that the impurities are essentially water and methanol, and also indicated that the concentration of these impurities is between 200 and 1000 parts per million. Higher concentrations of these two substances can be removed, as already indicated, from the relatively pure formaldehyde in a simpler manner by "drying" or "freezing" in a series of U-tubes, scrubber or washing tubes, but the final, successful purification requires always the formation of a small amount of pre-polymer which forms partly as an opaque surface film on the walls of the vessels and partly as a fine suspension in the reaction medium. This suspension must be removed by filtration before the final polymerization reaction can be properly carried out and I have found that even small traces of finely suspended prepolymer particles disturb the course of the ultimate polymerization.

As a consequence of these experiments, I have sought and found an improved and more practical method of purifying the formaldehyde for its subsequent polymerization to a truly macromolecular polymer. In accordance with the present invention, I have found that suspensions of finely divided, e.g. submicroscopic particulate, silica prepared in a hot gaseous environment by hot vapor phase hydrolysis or pyrolysis of a silicon compound, can be used successfully to purify a solution of formaldehyde in an inert solvent, either by adsorbing the dangerous impurities such as water, methanol or alcohol, or by initiating the polymerization of very small amounts of the formaldehyde, the growing chains of which are terminated by said impurities, or both, and thereby scavenging the system of same. The percentage of formaldehyde prepolymerized, and therefore lost, in this prepurification, is substantially less than one percent, and the silica suspension which carries the impurities can easily be separated from the rest of the system by filtration, or even by simple sedimentation, thus providing a complete scavenging of the system. This method of my invention offers the great advantage that the rate of the final polymerization is much greater than if the pre-purification is carried out by any other means. Moreover, known methods of scavenging monomeric formaldehyde by prepolymerization prior to final polymerization, consume as much as 20% of the starting monomer.

In accordance with the present invention, I have also found that glass may be used as a means of initiating the prepolymerization. Ordinary Pyrex glass was meticulously ground to the greatest degree possible, and the extremely fine glass particles were separated according to size by the rate of settling in water, and only the finest particles requiring the longest time to settle were used. These particles were dried in a stream of carefully dried nitrogen at temperatures of about 400° C. which was not high enough to cause coalesence of the particles, and these dried finely divided glass particles were used similarly to the finely divided silica, and although some degree of success was obtained with such glass particles as a scavenger, the finely divided silica proved to be more effective and was adopted as the preferred scavenger, in accordance with this invention.

As a consequence, with the use of finely divided silica as a scavenger, it was possible to develop both a batch and a continuous process for the preparation of a polyformaldehyde having intrinsic viscosities above 1.0 and generally above 2.0, as measured in 0.5% solutions of the polymer in parachlorophenol at 60° C.

The finely divided silica that may be used in practicing the present invention is extremely porous, very light and relatively inert which has a physical structure which may be characterized as a tenacious web of microscopic silica filaments, and substantially that of an aerogel. It has a bulk density ranging from about 3 to 15 pounds per cubic foot, a surface area of about 100 to 250 sq. meters per gram, and a purity of 99.7% or higher, with a particle size ranging from about 0.5 to 5 microns. These products are available commercially and are sold under various tradenames such as Cab-o-sil (Godfrey L. Cabot, Inc.), Santosil (Monsanto Chemical Co.), Quso (Philadelphia Quartz Co.), and D.C. Silica (Dow-Corning Corp.).

The temperature at which the scavenging step is carried out will range generally from about −20° C. to about −80° C., but is preferably about −50° C. to −60° C. The final polymerization is generally carried out at a somewhat lower temperature, ranging down to about −75° C.

The amount of scavenger employed in relation to monomeric formaldehyde is not critical, and the presence of excess silica in the final polymerized product does no harm, and does not interfere with extrusion or molding. The silica may be added to the monomeric formaldehyde if the latter is kept in liquid form, or, as illustrated in the accompanying examples, the gaseous monomer may be passed into a suspension of the thoroughly dried finely divided silica in an organic diluent. In the latter case, the amount of silica may range from about 0.1% to about 5% by weight of the diluent. In general, it is advantageous to employ from about 0.5% to about 3% of silica by weight of the amount of formaldehyde treated, and from about 1% to about 5% by weight in the case of glass scavengers.

Following the scavenging portion of the process, a suitable polymerization catalyst may be added to initiate the final polymerization of the remaining monomeric formaldehyde, the latter being carried out in accordance with conventional procedures. Suitable catalysts include amines, particularly, alkylamines, such as, for example, methyl, ethyl, propyl, butyl, dibutyl, tributyl, octyl, and like amines. Moreover, inorganic catalysts such as the alkaline earth oxides, are suitable, for example, calcium, barium, and strontium oxides.

Both the scavenging and final polymerization may be carried out in presence of an organic liquid medium which is a nonsolvent for the polymer, but may be a solvent for the monomer, such as hexane, toluene, or tetrahydrofuran.

*Example 1*

A suspension of 2.5 grams of thoroughly dried, finely divided Cab-o-sil, was prepared in 150 ml. of dry hexane with good agitation and the suspension was cooled to −50° C. Then with stirring, formaldehyde gas, which was produced by the vaporization of "pure" liquid monomeric formaldehyde and had been dried down to less than 0.2% moisture content was introduced until altogether 80 grams of $CH_2O$ were added to the system. As soon as the addition of formaldehyde was completed the solution was cooled to −75° C. and 0.1 gram of anhydrous tributylamine in 10 ml. of anhydrous toluene was added, whereupon polymerization began at the surface of the Cab-o-sil particles which become surrounded by a semi-transparent gelatinous mass which adheres firmly to the silica suspension. Very soon the formation of polymer was observed independently of the silica particles, and the solution was filtered rapidly through a sintered glass disk by pressure of pure anhydrous nitrogen. The filtered solution continued to polymerize in the filtrate as a finely divided white powder. After 60 minutes the polymerization was complete, the product was filtered off, washed with methanol and then dried in vacuum, and finally at 100° C. for 12 hours, still in vacuum. The product was 78.2 grams of a white powder which melted relatively sharply at 180° C. and did not dissolve in any organic solvent at room temperature. Osmotic measurement carried out with this material in dilute solutions in p-chlorophenol at 90° C., gave a molecular weight of 168,000. The intrinsic viscosity in p-chlorophenol was 2.15. The polymer was molded by compression and by injection and gave hard, tough objects with a high softening point.

*Example 2*

A similar experiment under the same conditions as in Example 1 was carried out but the prepolymer was not filtered off. Instead at the end of 15 minutes stirring was slowed down so that the silica particles coated with paraformaldehyde settled out while most of the small amount of polyformaldehyde, because of its lower density, remained in suspension. 10 ml. of the suspension was drawn off through a bottom stopcock. In this manner the $SiO_2$-rich sediment was drawn off. It was carefully dried and was found to weigh 2.92 grams. On careful ignition it gave a residue of 2.35 grams of silica, and so contained 0.57 gram of polyformaldehyde. The supernatant material was stirred for an additional hour, and then was diluted with methanol, filtered and dried and weighed 79.01 grams which on analysis of a portion was found to contain 78.9 grams of polyformaldehyde and 0.11 gram of silica. This polyformaldehyde in spite of its ash content of 0.14% showed the same properties as the product of the previous experiment.

Example 3

In a third experiment, no separation at all was made, and the total product containing approximately 3% of $SiO_2$, was lower in melting point by only about 1 to 2° C. However, the product was quite as easily molded by injection or compression as the extremely finely divided silica seemed to have absolutely no detectable effect on the molding operation and none whatsoever on the appearance of the finished product.

A control run made without any silica and with the same tributylamine catalyst polymerized at a slower rate and gave a product with a lower melting point, indicating that the $SiO_2$ itself acts as a catalyst in this finely divided state as well as a scavenger.

Example 4

Other catalysts than tributylamine may be used. For example, 100 grams of pure anhydrous monomeric formaldehyde containing less than 0.1% of water was dissolved in 700 grams of anhydrous tetrahydrofuran, and 2 grams of carefully dried Cab-o-sil was added at —55° C. The mixture was stirred carefully for 10 minutes, then allowed to settle for 5 minutes and 25 ml. of suspension was drawn off from the bottom. To the remaining suspension 2.5 grams of finely divided dry CaO catalyst were added and the stirring was immediately begun with the temperature maintained at —55° C. The CaO contained only traces of moisture (as $Ca(OH)_2$) as determined by heating in a platinum tube at above 500° C. with a slow current of dry nitrogen passing through the tube. The loss in weight was 1.3% of which 0.6% was $CO_2$ as determined by analysis of the effluent gas and 0.7% was $H_2O$ (by difference).

There seemed to be an induction period of about 6 minutes in which polymerization was slow, as in the prepolymerization, then rapid polymerization set in requiring sharp cooling to prevent rise in temperature. After one hour the polymerization was essentially complete. The product was filtered, washed with cold methanol, then dried carefully in vacuum overnight at 100° C. The product was a hard white crystalline powder which weighed 94.7 grams and had the following properties:

Density 1.427
Intrinsic viscosity 1.06
Modulus of elasticity (70° F.) 460,000 p.s.i.
Melting point 174° C.
Moisture regain 0.47%

A sample was ashed, and the ash was found to consist chiefly of CaO, with a small amount of $SiO_2$.

Example 5

A similar run was made with finely divided anhydrous BaO instead of CaO as the catalyst (2.7 grams of finely divided BaO) and the results were quite similar in yield and character of product.

Example 6

In still another experiment 100 grams of dry liquid monomeric formaldehyde were dissolved in 560 grams of dry toluene which had been distilled into the reaction vessel from sodium. The toluene had been cooled to —50° C. 5 grams of carefully dried Cab-o-sil were added and agitated for 10 minutes and a small but visible amount of polymerization occurred as evidenced by a white film on the reactor walls and a gelatinization of the silica particles. The stirrer was stopped and after 10 minutes settling 20 ml. of suspension were drawn off from the bottom and stirring was again commenced. Then 3.4 grams of finely powdered anhydrous $AlCl_3$ which had been carefully ground in a dry mortar in a dry box were added with constant agitation. The reaction begins immediately at —50° C. and is essentially completed in 2 hours. The particles of catalyst are all coated with a layer of polyformaldehyde. The product was filtered, washed with toluene, then with methanol and dried over-night in vacuum at 100° C. The yield was 92 grams of a hard, opaque, white crystalline powder with the following properties:

Melting point 176° C.
Heat distortion temperature 179° C.
Intrinsic viscosity 1.26
Tensile strength (70° F.) 10,600 p.s.i.
Elongation to break (70° F.) 21%
Modulus of elasticity (70° F.) 460,000 p.s.i.

I claim:

1. The method of purifying monomeric formaldehyde which comprises polymerizing substantially anhydrous monomeric formaldehyde in contact with finely divided silica suspended in an inert organic liquid which is a solvent for the monomer but not for the polymer until not more than about 1% has been converted to polymer, and separating the polymer.

2. The method of purifying monomeric formaldehyde which comprises introducing substantially anhydrous vapor of monomeric formaldehyde into a suspension of finely divided silica in an inert organic liquid which is a solvent for the monomer but not for the polymer until not more than about 1% has been converted to polymer, and separating the polymer.

3. The method of preparing high molecular weight polymers of formaldehyde which comprises first purifying monomeric formaldehyde by polymerizing substantially anhydrous monomeric formaldehyde in contact with finely divided silica suspended in an inert organic liquid which is a solvent for the monomer but not for the polymer until not more than about 1% has been converted to polymer, separating the prepolymer formed, and then polymerizing the remaining monomeric formaldehyde in contact with a polymerization catalyst selected from the group consisting of an amine and an alkaline earth oxide.

4. The method of preparing high molecular weight polymers of formaldehyde which comprises first purifying monomeric formaldehyde by passing substantially anhydrous vapor of monomeric formaldehyde into a suspension of finely divided silica in an inert organic liquid which is a solvent for the monomer but not for the polymer until not more than about 1% has been converted to polymer, separating the partial polymer, and then polymerizing the remaining monomeric formaldehyde in contact with a polymerization catalyst selected from the group consisting of an amine and an alkaline earth oxide.

5. The method of claim 3 in which the polymerization catalyst is an amine.

6. The method of claim 3 in which the polymerization catalyst is an alkaline earth oxide.

7. The method of claim 3 in which the organic liquid is hexane.

References Cited in the file of this patent

UNITED STATES PATENTS

| | | |
|---|---|---|
| 1,864,908 | Jaeger | June 28, 1932 |
| 2,841,570 | MacDonald | July 1, 1958 |